United States Patent [19]

Hartmann

[11] Patent Number: 4,770,433
[45] Date of Patent: Sep. 13, 1988

[54] MULTIPLE SPEED DRIVE FOR MOUNTAIN BICYCLES

[76] Inventor: Dirck T. Hartmann, 4121 Morning Star Dr., Huntington Beach, Calif. 92649

[21] Appl. No.: 88,885

[22] Filed: Aug. 18, 1987

[51] Int. Cl.⁴ .............................................. B62M 1/00
[52] U.S. Cl. .................... 280/260; 280/238; 280/284; 280/289 G
[58] Field of Search ............... 280/259, 260, 261, 284, 280/285, 289 G, 236, 238

[56] References Cited

U.S. PATENT DOCUMENTS

| | | | |
|---|---|---|---|
| RE 28,335 | 2/1975 | Wood | 280/289 G |
| 4,706,982 | 11/1987 | Hartmann | 280/260 |
| 4,721,015 | 1/1988 | Hartmann | 280/260 |

*Primary Examiner*—John Love
*Assistant Examiner*—Donn McGiehan

[57] ABSTRACT

An enclosed drive for a mountain bicycle features a chain case which replaces the conventional chain stay on the right side of the bicycle coupled with an improved twelve speed transmission using four countershafts, which is housed in a gear case inside the rear wheel hub. The gear case is bolted to a cylindrical extension of the chain case which mounts the rear wheel bearing on the right side. The chain case is press fit on a steel tube rotatably mounted in the bottom bracket, and the chain case cover is a close shear fit on the rear spindle which is clamped with over center quick disconnects in dropouts at the lower ends of conventional seat stays. To change the rear tire, the rear spindle is released and the chain case is rotated about the axis of the bottom bracket to swing the wheel clear of the frame. The wheel can then be separated from the bicycle without disturbing or exposing any drive train components by removing four wheel nuts and pulling the wheel off from the left side.

6 Claims, 3 Drawing Sheets

MULTIPLE SPEED DRIVE FOR MOUNTAIN BICYCLES

BACKGROUND OF THE INVENTION

1. Field of the Invention:

This invention relates generally to multiple speed transmissions using countershafts which are housed within the rear hub of chain driven bicycles coupled with a modification of a conventional bicycle frame which permits the chain to be fully enclosed.

2. Description of the Prior Art:

Multiple speed bicycles commonly use either a chain and derailleur system or a chain driven rear hub employing one or more epicyclic gear trains. Conventional mountain bicycles and all-terrain bicycles (ATBs) use chain and derailleur systems commonly with eighteen speeds, of which about fourteen speeds are useable. On all chain driven bicycles the chain must be kept reasonably clean and well oiled for efficient operation and to prevent premature chain failure and chain maintenance becomes particularly troublesome if the bicycle is ridden extensively on dirt roads and trails. With the current popularity of mountain bicycles, a sealed chain drive is needed to minimize the maintenance problem in a bicycle which can serve for commuting as well as off-road recreation riding. An object of the present invention is to provide a chain enclosure which essentially eliminates chain maintenance coupled with a multiple speed transmission housed within a sealed gear case inside the rear wheel hub, with a range of gear ratios comparable to the currently popular mountain bicycles using the chain/derailleur system.

SUMMARY OF THE INVENTION

The enclosed multiple speed drive in accordance with the present invention includes a chain case, preferably of die cast aluminum, with a chain case cover which is attached to it with flush head screws. The chain case is press fit on a steel tube which is rotatably mounted in an otherwise conventional bottom bracket, and the chain case cover is a close shear fit on the rear spindle. The case and cover replace the conventional chain stay on the right side of the bicycle, enclose the chain and sprockets, and react the load from drive chain tension.

The twelve speed transmission in accordance with this invention is housed in a gear case inside the rear wheel hub. The gear case is rigidly fastened to the chain case. The transmission includes a drive gear carrier driven by the rear sprocket with four drive gears rotatably mounted on it, with a means for locking any selected one of the drive gears to the drive gear carrier; a driven gear carrier with three driven gears rotatably mounted on it with a means for locking any selected one of the driven gears to the driven gear carrier; four countershafts with the seven gears on each rigidly joined, preferably by flash welding, with each countershaft gear in constant mesh with one of the driving or driven gears; and a conventional one way clutch coupling the driven gear carrier with a wheel hub driving plate. The wheel hub is mounted on four studs press fit in the wheel hub driving plate. The driving plate is mounted on an angular contact ball bearing on the spindle and supports the wheel hub on the left side. A wheel hub closing plate, which is threaded into a cylindrical extension of the wheel hub driving plate, is mounted on an angular contact ball bearing on a short cylindrical extension of the chain case and supports the wheel hub on the right side.

The means for selectively locking the driving and driven gears to their respective carriers includes an external circumferential groove in the carrier in the plane of each gear, with the grooves extending radially inward to a depth equal to about two thirds the thickness of the carrier; a pair of diametrically opposed internal axial grooves which extend radially outward to a depth equal to about two thirds of the thickness of the carrier; a pair of ring halves installed in each circumferential groove with radial projections locking them to the gear installed over them, and internal teeth for engaging the tooth form on the drive or driven gear selector which is slidably mounted in the axial grooves; and pin/chain assemblys installed with return springs on the centerline of the spindle and connected via conventional cable assemblys with shift levers on the bicycle handlebars for controlling the axial position of the drive and driven gear selectors. Each drive and driven gear with its ring halves locked to it, rotates freely on its respective carrier unless the drive or driven gear selector is located in its plane.

An over center quick disconnect comprising a cap link pinned to the bicycle frame, a pair of spring links pinned to the cap link, and a handle pinned to the spring links, is used to clamp each end of the spindle in its frame dropout by placing the nose of the handle in a notch in the frame on the aft side of the dropout and rotating the handle up and forward to force the spring links overcenter. The wheel is separated from the bicycle by removing the four nuts from the studs press fit in the hub driving plate, releasing the quick disconnects, rotating the chain case about the axis of the bottom bracket to swing the wheel clear of the bicycle frame, and pulling the wheel off the mounting studs from the left side.

DESCRIPTION OF THE PREFERRED EMBODIMENT

Figure 3:
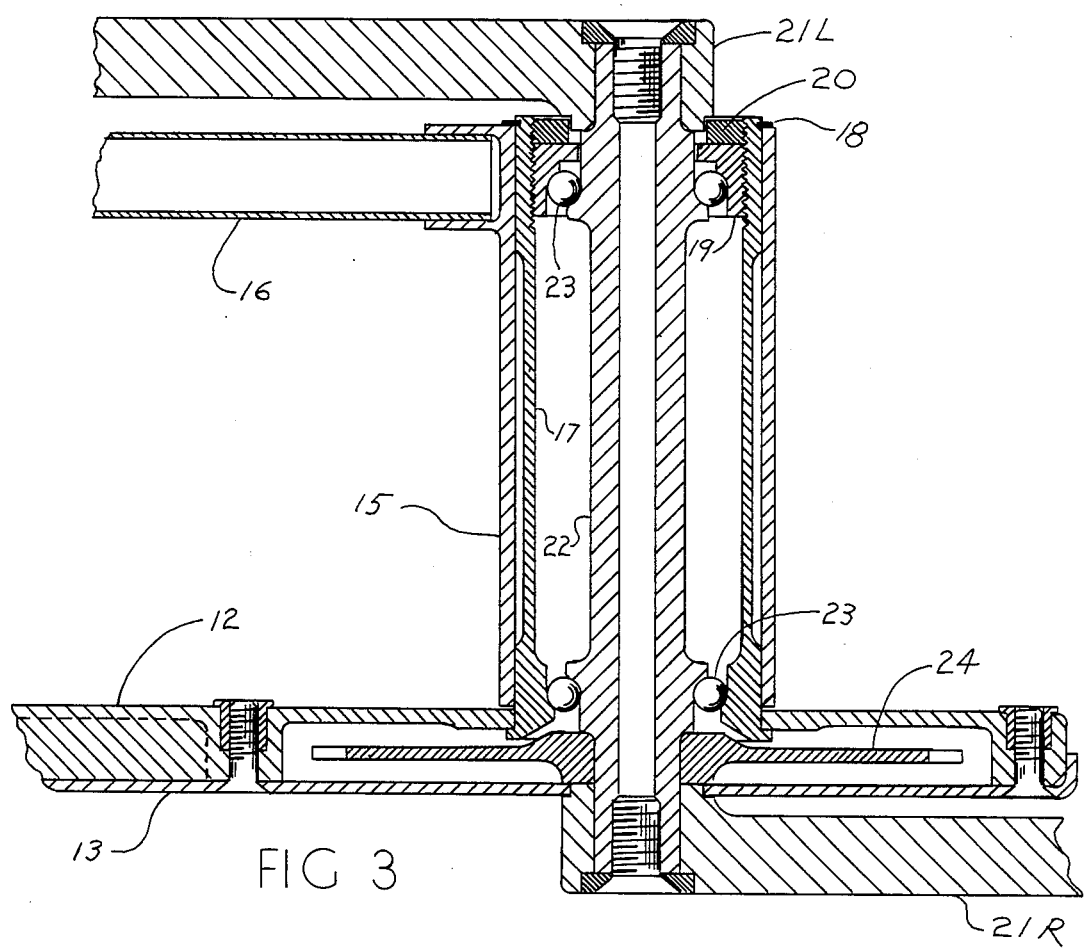
FIG. 3 is a section taken along the line 3—3 of FIG. 1.

Referring to FIG. 3, the enclosed chain drive in accordance with the present invention includes a chain case 12; a chain case cover 13; a bottom bracket 15 which is integral with the bicycle frame and conventional except that the chain case replaces the chain stay on the right side; the left side chain stay 16; and the bearing tube 17 which is press fit in the chain case 12. The bearing tube 17 is mounted with a running fit in the bottom bracket 15 with its axial position secured by the snap ring 18. The end of the bearing tube 17 on the right side forms the outer race for the ball bearings 23 which support the pedal drive shaft 22. The other end of the bearing tube is threaded to receive the bearing nut 19 which forms the outer race for the ball bearings 23 which support the pedal drive shaft 22 on the left side. The bearing preload is adjusted with the bearing nut 19 and secured with the lock nut 20. The cross section of the pedal drive shaft 22 is square at the ends for the transfer of torque from the pedal crank arms 21L and 21R. The pedal crank arm 21R secures the axial position of the forward sprocket 24 against a shoulder on the drive shaft 22. A small running clearance between the chain case cover 13 and a shoulder on the crank arm 21R, and between the locknut 20 and the crank arm 21L, minimizes the intrusion of dirt.

Figure 2:
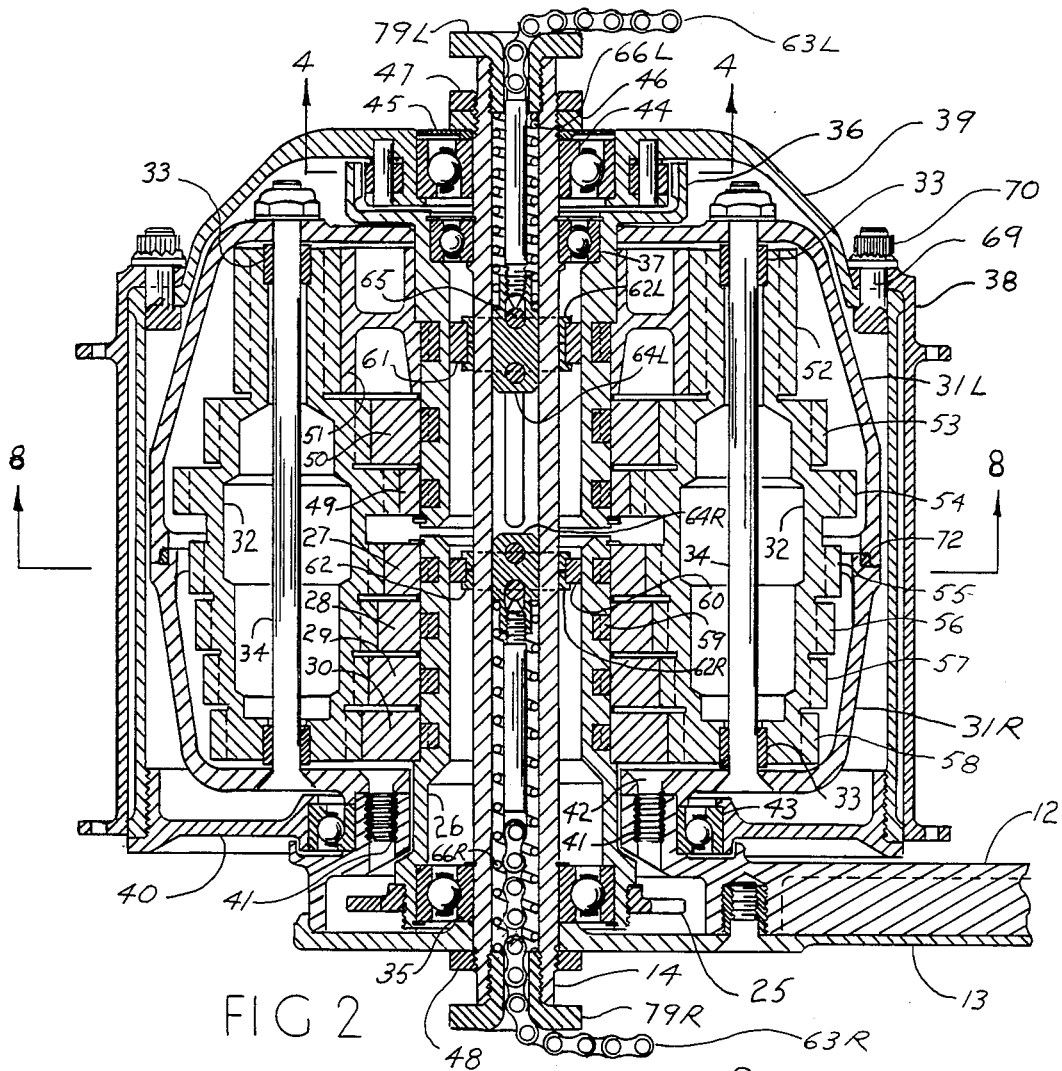
FIG. 2 is a section taken along the line 2—2 of FIG. 1.
Figure 1:
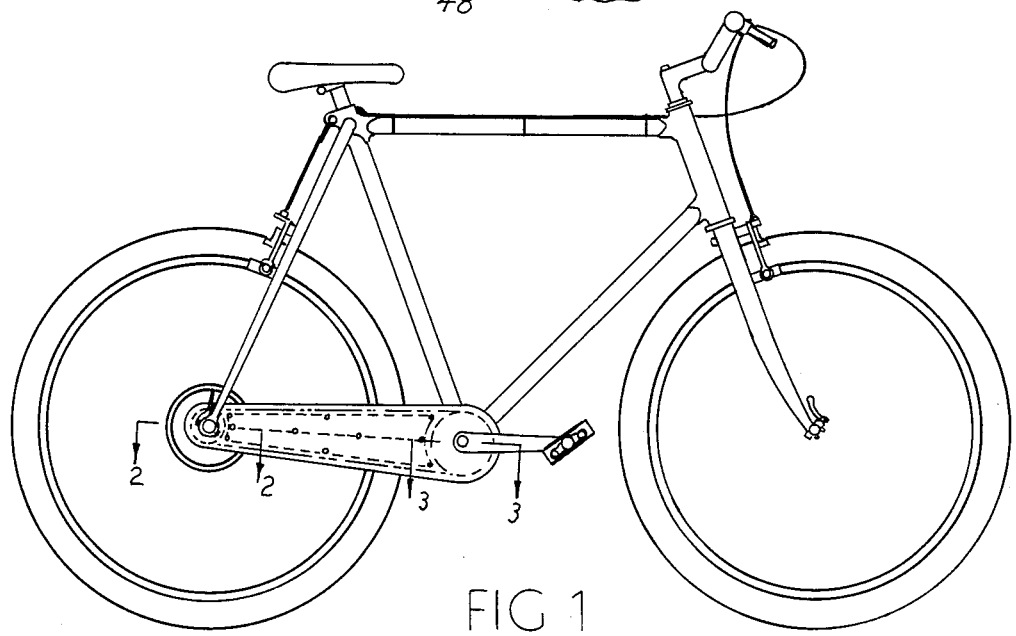
FIG. 1 is a side elevation view of a mountain bicycle with a chain case and a twelve speed transmission inside the rear wheel hub according to the present invention.
Figure 8:
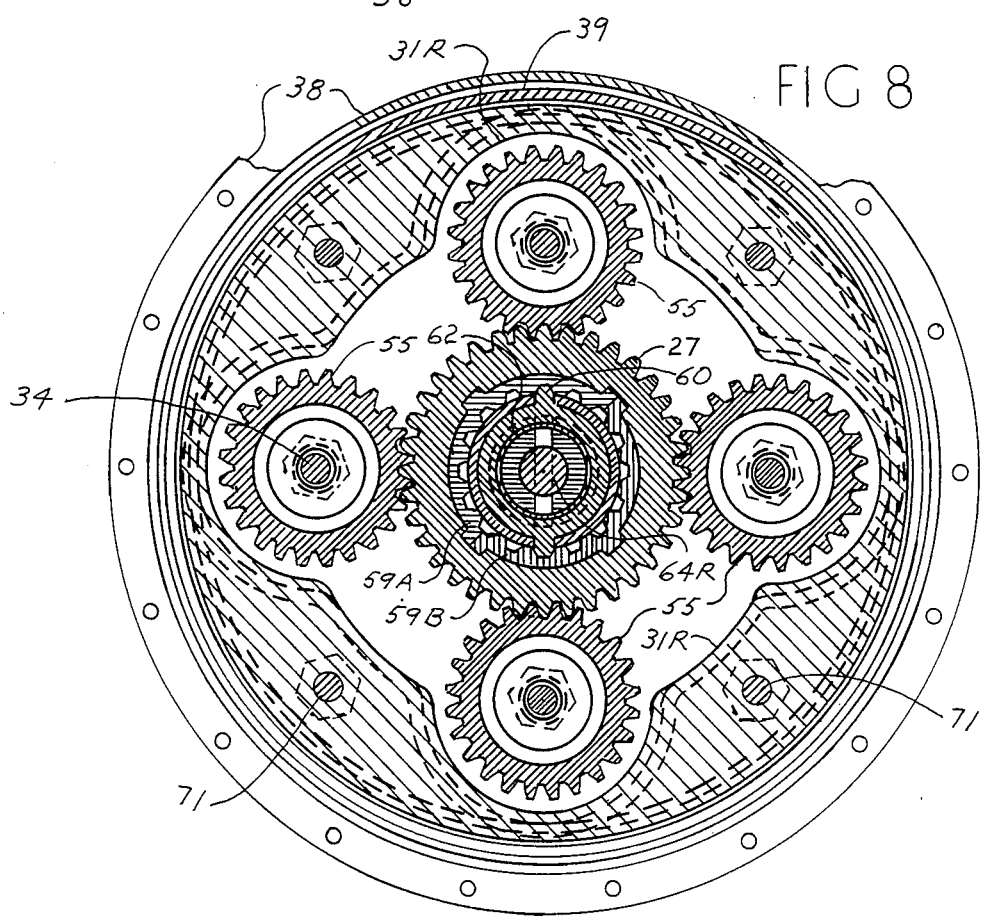
FIG. 8 is a section taken along the line 8—8 of FIG. 2.

Referring to FIG. 2, the twelve speed transmission in accordance with the present invention includes a spindle 14 which is a close shear fit nside the chain case cover 13; a drive gear carrier 26 mounted on a ball bearing 35; a chain sprocket 25 threaded onto the carrier 26 with right hand threads; four drive gears 27, 28, 29, and 30 rotatably mounted on the carrier 26; a driven gear carrier 36 mounted on a ball bearing 37; three driven gears 49, 50, and 51 rotatably mounted on the carrier 36; countershafts 32 with seven gears 52, 53, 54, 55, 56, 57, and 58 rigidly joined together and in constant mesh with the drive and driven gears; a gear case in two halves 31L and 31R; a wheel hub driving plate 39; a wheel hub closing plate 40; and a wheel hub 38. An oil impregnated bushing of sintered bronze 33 is press fit into the opposite ends of each countershaft. The bushings 33 rotate on the polished surface of the bolts 34 which pass through the two halves of the gear case 31L and 31R. As shown in FIG. 8, contoured flanges on the gear case halves 31L and 31R are joined by the bolts 71 and serve with bolts 34 to clamp together the gear case halves 31L and 31R. As shown in FIG. 2, migration of lubricant past the gear case joint is prevented by the elastomeric seal 72. The gear case half 31R is joined to the chain case 12 with flush head screws 42 which thread into helicoil inserts 41 installed in the aluminum chain case 12.

The gear case is enclosed by the wheel hub driving plate 39 which is mounted on an angular contact ball bearing 44, and by the wheel hub closing plate 40 which is threaded into a cylindrical extension of the driving plate 39. The closing plate 40 is supported by an angular contact ball bearing 43 which is mounted on a short cylindrical extension of the chain case 12. Proper preload of the bearings 43 and 44 is achieved with a preload adjustment nut 46 and secured with a locknut 47, both of which are threaded on the left end of the spindle 14, and the preload is reacted by the nut 48 on the right side which clamps the chain case cover 13 against the drive gear carrier bearing 35. The left side bearing 44 is protected by a shield 45, and the right side bearing 43 is protected by a lip on the chain case 12. An inward facing flange on the wheel hub 38 is mounted on four studs 69 which are press fit in the wheel hub driving plate 39, and clamped with the wheel nuts 70.

Figure 4:
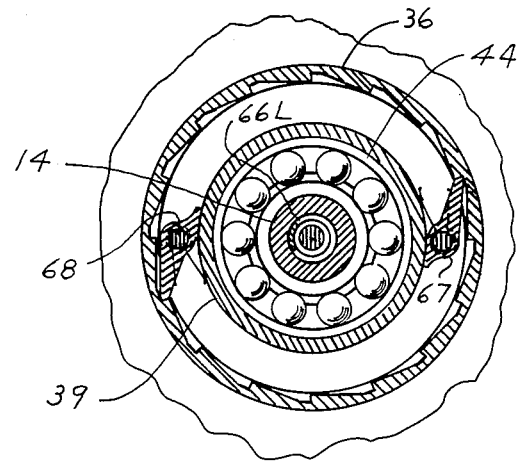
FIG. 4 is a section taken along the line 4—4 of FIG. 2

Referring to FIG. 2 and particularly to FIG. 4, it can be seen that ratchet teeth on the driven gear carrier engage a pair of spring loaded pawls 67 mounted on the driving plate 39 with pins 68, and drive the wheel in the manner of a conventional one way bicycle clutch.

Figure 5:
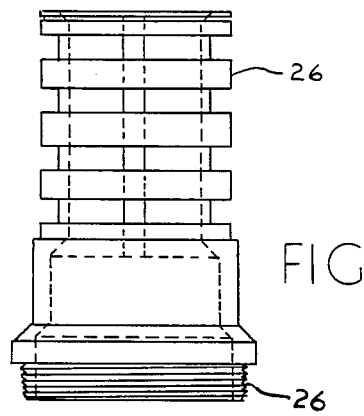
FIG. 5 is a plan view of the drive gear carrier.
Figure 6:
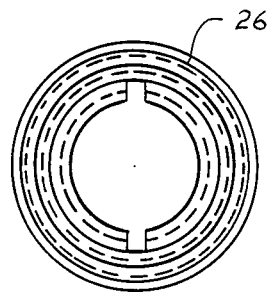
FIG. 6 is an end view of the drive gear carrier.

Referring to FIG. 2, FIGS. 5 and 6, and particularly to FIG. 8, it can be seen that a pair of ring halves 59A and 59B is installed in each of four circumferential grooves in the drive gear carrier 26 with radial projections on the ring halves locking them to the gear within which they are installed. A drive gear selector 60 is installed in the annular space between the drive gear carrier 26 and the spindle 14 with a pair of projections on the selector 60 extending radially outward the depth of a pair of diametrically opposed axially grooves in the carrier 26 and engaging internal teeth on the ring halves 59A and 59B and locking the ring halves to the carrier 26. A driven gear selector 61 is used in a similar manner for locking the driven gears to the driven gear carrier 36.

The means for controlling the axial position of the drive gear selector 60 and driven gear selector 61 includes a pair of plugs 64L and 64R located in a hole through the center of the spindle 14; a pin/chain assembly 63L and 63R, threaded into each of the plugs 64L and 64R, each of which is connected via a conventional cable (not shown) to a shift lever on the bicycle handlebars;; a pair of return springs 66L and 66R; a pair of hollow bolts 79L and 79R which provide cam surfaces for the pin/chain assemblys 63L and 63R and stops for the return springs 66L and 66R; a pair of shoulder sleeves 62L between the driven gear selector 61 and the spindle 14, and a second pair of shoulder sleeves 62R between the drive gear selector 60 and the spindle 14; and a pair of cross pins 65 through each of the plugs 64L and 64R. An L shaped cut across both ends of the cross pin 65 fits inside the shoulder sleeves 62L and 62R which fix the lateral position of the cross pins. The outboard hole through each of the plugs 64L and 64R is elongated to permit installation of the cross pins, and the pin/chain assemblys and return springs hold the outboard cross pins at the inboard side of the elongated holes. The width between the shoulders of a mated pair of shoulder sleeves is slightly greater than the width of its associated drive or driven gear selector so that the gear selectors rotate freely on the shoulder sleeves. The length of axial slots in the spindle 14 allows sufficient axial of the cross pins 65 for the gear selectors to be positioned in the plane of any selected gear.

Figure 7:
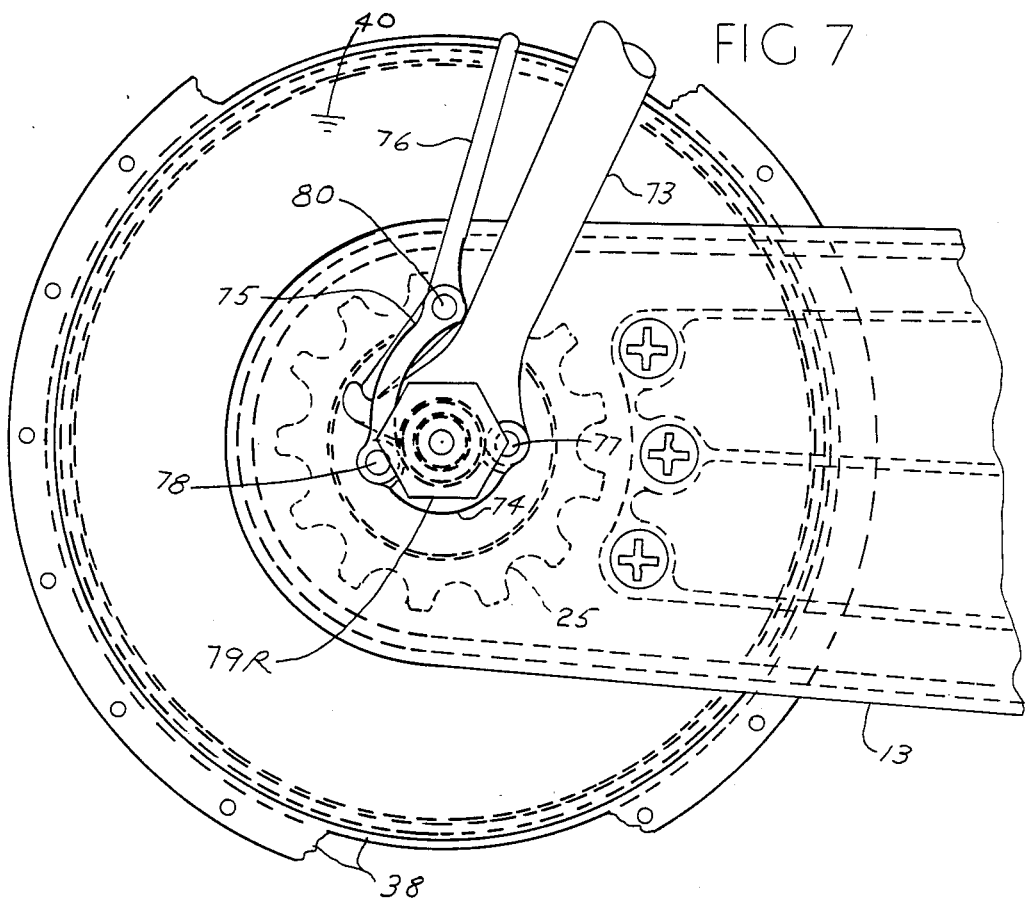
FIG. 7 is a side elevation view of the rear hub.

As shown in FIG. 7, the ends of the spindle 14 are clamped in the dropouts at the lower ends of the seat stays 73 by the over center quick disconnect comprising a cap link 74 which is joined to the seat stay by a pin 77; a pair of spring links 75 which are joined to the cap link 74 by the pin 78; and a handle which is joined to the spring links by the pin 80. A quick release of the spindle is achieved by rotating the handle aft to force the spring links over center and rotating the cap link about the pin 77 until it clears the arc followed by the spindle when the chain case 13 is rotated about the axis of the bottom bracket.

In the example design developed to illustrate this invention, 20 pitch involute gears with a 20 degree pressure angle were selected with a centerline distance between the spindle and the countershafts of 1.5 inches, N1, N2, N3, N4 are used to signify the number teeth on the meshing drive and the countershaft gears, and countershaft and driven gears respectively. The selected gears and resulting bicycle gear ratios for a sprocket ratio of 200 (26 forward, 13 tooth rear chain sprockets) are presented in the table below. The resulting equivalent wheel diameters with a 26 inch diameter mountain bicycle wheel are included for easy comparison with the ratios and equivalent wheel diameters available with a typical chain and derailleur mountain bicycle.

| SPEED | N1/N2 | N3/N4 | RATIO | EQUIV. WHEEL DIA. |
| --- | --- | --- | --- | --- |
| one | 36/24 | 12/48 | .750 | 19.5 |
| two | 38/22 | | .864 | 22.5 |
| three | 40/20 | | 1.000 | 26 |
| four | 42/18 | | 1.167 | 30.3 |
| five | 36/24 | 20/40 | 1.500 | 39 |
| six | 38/22 | | 1.727 | 44.9 |
| seven | 40/20 | | 2.000 | 52.0 |
| eight | 42/18 | | 2.333 | 60.7 |
| nine | 36/24 | 28/32 | 2.625 | 68.2 |
| ten | 38/22 | | 3.023 | 78.6 |
| eleven | 40/20 | | 3.500 | 91.0 |
| twelve | 42/18 | | 4.083 | 106.0 |

The gears and resulting gear ratios listed above are presented to illustrate a preferred embodiment, and the present invention should not be considered as limited to them. It is intended that the following appended claims be interpreted as including all such modifications as fall within the true scope and spirit of the present invention.

I claim:

1. In a bicycle with a frame including a bottom bracket, a chain stay on one side only, a pair of conventional seat stays including dropouts on the lower ends of said seat stays, and a rear spindle clamped in said dropouts, an improved multiple speed drive for mountain bicycles comprising:

a steel bearing tube with a flange on one end rotatably mounted and axially captive in said bottom bracket;

a chain case press fit on said bearing tube inside said flange;

a pedal drive shaft mounted on conventional ball bearings within said bearing tube with said bearing tube forming the outer race for said ball bearings on said chain case said, and a conventional bearing nut threaded in the opposite end of said bearing tube forming the outer race for said ball bearings on the other side;

a locknut securing the position of said bearing nut;

a forward sprocket located within said chain case and fixed on said pedal drive shaft for rotation therewith;

a rear sprocket located within said chain case and fixed on a drive gear carrier rotatably mounted on said rear spindle;

a conventional bicycle drive chain located within said chain case for driving said rear sprocket from said forward sprocket;

a chain case cover rigidly attached to said chain case and enclosing said sprockets and said drive chain and providing axial support and indexing for said rear spindle;

left and right side pedal crank arms fixed on said pedal drive shaft with a shoulder on one of said pedal crank arms a close running fit inside said chain case cover and a shoulder on the other of said pedal crank arms a close running fit inside said locknut;

an over center quick disconnect clamping each end of said rear spindle in said dropouts;

a gear case concentric with said rear spindle and rigidly fixed to said chain case;

multiple drive gears rotatably mounted on said drive gear carrier with a means for locking any selected one of said multiple drive gears to said drive gear carrier;

a driven gear carrier rotatably mounted on said rear spindle;

multiple driven gears rotatably mounted on said driven gear carrier with a means for locking any selected one of said multiple driven gears to said driven gear carrier;

multiple countershafts rotatably mounted in said gear case;

multiple gears rigidly fixed on each of said multiple countershafts in constant mesh with said driving gears and said driven gears;

a driving plate rotatably mounted on said rear spindle;

a closing plate rotatably mounted between said chain case and said gear case and joined to a cylindrical extension of said driving plate;

a conventional one way clutch coupling said driven gear carrier with said driving plate; and a wheel hub with a flange on one end fastened to said driving plate for concentric rotation therewith, and the other end supported on said closing plate.

2. An improved multiple speed drive for mountain bicycles according to claim 1 wherein said drive gear locking means includes multiple external circumferential grooves and a pair of diametrically opposed internal axial grooves in said drive gear carrier; a pair of ring halves with multiple internal teeth and multiple external projections installed in each of said circumferential grooves; each pair of ring halves receiving one of said multiple drive gears; said external projections on said ring halves locking said ring halves to said drive gears for rotation therewith; a drive gear selector located in an annular space between said drive gear carrier and said rear spindle; radial arms on said drive gear selector extending outward into said pair of diametrically opposed internal axial grooves for engaging said internal teeth on said ring halves and locking the associated one of said multiple drive gears to said drive gear carrier for rotation therewith; and a means for adjusting the axial position of said drive gear selector to position it in the plane of any selected one of said multiple drive gears.

3. An improved multiple speed drive for mountain bicycles according to claim 2 wherein said means for adjusting the axial position of said drive gear selector includes an axial hole through said rear spindle; a first plug slidably installed in said axial hole; a first return spring installed in said axial hole and engaging said first plug; a hollow bolt threaded into one end of said rear spindle and retaining said first return spring; a first pin/chain assembly threaded into said first plug with said chain passing out through said hollow bolt; a cam surface on said hollow bolt permitting sliding with a 90 degree bend in said chain; a pair of shoulder sleeves installed in a small annular space between said drive gear selector and said spindle with said drive gear selector rotating freely between said shoulders; a first pair of diametrically opposed axial slots through the wall of said rear spindle; a pair of cross pins passing through holes in said first plug and extending out through said axial slots; a notch in each end of said cross pins recieveng said shoulder sleeves with said shoulder sleeves securing the radial position of said cross pins; and a first conventional cable assembly connecting said first pin/chain assembly with a first shift lever on handlebars of said bicycle.

4. An improved multiple speed drive for mountain bicycles according to claim 1 wherein said driven gear locking means includes multiple external circumferential grooves and a pair of diametrically opposed axial grooves in said driven gear carrier; a pair of ring halves with multiple external projections and multiple internal teeth installed in each of said circumferential grooves; each pair of ring halves receiving one of said multiple driven gears; said external projections on said ring halves locking said ring halves to said driven gears for rotation therewith; a driven gear selector located in an annular space between said driven gear carrier and said spindle; radial arms on said driven gear selector extending radially outward into said axial grooves for engaging said internal teeth on said ring halves and locking the associated one of said driven gears to said driven ear carrier for rotation therewith; and a means for adjusting the axial position of said driven gear selector to position it in the plane of any one of said multiple driven gears.

5. An improved multiple speed drive for mountain bicycles according to claim 4 wherein said means for adjusting the axial position of said driven gear selector includes an axial hole through said spindle; a second plug slidably installed in said axial hole; a second return spring installed in said axial hole and engaging said second plug; a hollow bolt threaded into the end of said spindle to retain said second return spring; a second pin/chain assembly threaded into the end of said second plug with said chain passing out through said hollow bolt; a cam surface on said hollow bolt permitting sliding with a 90 degree bend in said chain; a pair of shoulder sleeves installed in a small annular space between said driven gear selector and said rear spindle with said driven gear selector rotating freely between said shoulders; a second pair of diametrically opposed slots through the walls of said spindle; a pair of cross pins passing through holes in said second plug and extending out through said second pair of diametrically opposed axial slots; a notch in each end of said cross pins receiving said shoulder sleeves with said shoulder sleeves securing the radial position of said cross pins; and a second conventional cable assembly including a quick release connecting said second pin/chain assembly with a second shift lever on handlebars of said bicycle.

6. An improved multiple speed drive for mountain bicycles according to claim 1 wherein said over center quick disconnect clamping each end of said rear spindle in said dropouts includes a cap link rotatably pinned to said bicycle frame forward of each of said dropouts; a pair of spring links rotatably pinned to said cap link; a handle rotatably pinned to said spring links; and a notch in said frame on the aft side of each of said dropouts for receiving said handle.

* * * * *